(12) United States Patent
Svedevall et al.

(10) Patent No.: US 10,433,238 B2
(45) Date of Patent: Oct. 1, 2019

(54) TRAFFIC CHARACTERISTIC INDICATION FOR CONNECTION ESTABLISHMENT CONTROL

(71) Applicant: Telefonaktiebolaget LM Ericsson (publ), Stockholm (SE)

(72) Inventors: Sofia Svedevall, Brokind (SE); Henrik André-Jönsson, Linköping (SE); Rasmus Axén, Linköping (SE); Lars Olofsson, Skanninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/064,521

(22) PCT Filed: Dec. 23, 2015

(86) PCT No.: PCT/EP2015/081190
§ 371 (c)(1),
(2) Date: Jun. 21, 2018

(87) PCT Pub. No.: WO2017/108135
PCT Pub. Date: Jun. 29, 2017

(65) Prior Publication Data
US 2019/0028959 A1 Jan. 24, 2019

(51) Int. Cl.
*H04W 4/00* (2018.01)
*H04W 48/06* (2009.01)
(Continued)

(52) U.S. Cl.
CPC .......... *H04W 48/06* (2013.01); *H04L 45/306* (2013.01); *H04W 24/08* (2013.01);
(Continued)

(58) Field of Classification Search
CPC ..................................................... H04W 48/06
See application file for complete search history.

(56) References Cited

U.S. PATENT DOCUMENTS

| 9,459,799 B1 * | 10/2016 | Naamad | G06F 3/0613 |
| 2009/0172210 A1 * | 7/2009 | Kesselman | H04L 47/805 |
| | | | 710/16 |

(Continued)

FOREIGN PATENT DOCUMENTS

WO 2015007093 A1 1/2015

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.6.0, Jun. 1, 2015, pp. 1-449, 3GPP, France.

*Primary Examiner* — Gerald A Smarth
(74) *Attorney, Agent, or Firm* — Sage Patent Group (57) ABSTRACT

A radio device (10) is configured with multiple applications. For each of the multiple applications, the radio device (10) determines at least one characteristic of traffic generated by the application. In response to one of the applications requiring establishment of a connection of the radio device (10) to the cellular radio network, the radio device (10) sends a request (202) for establishing the connection to the cellular radio network, the request (202) indicates the at least one characteristic corresponding to the application.

18 Claims, 9 Drawing Sheets

(51) Int. Cl.
  *H04W 28/24* (2009.01)
  *H04L 12/725* (2013.01)
  *H04W 76/10* (2018.01)
  *H04W 76/38* (2018.01)
  *H04W 76/27* (2018.01)
  *H04W 24/08* (2009.01)
  *H04W 28/02* (2009.01)
  *H04W 28/16* (2009.01)

(52) U.S. Cl.
  CPC ... *H04W 28/0268* (2013.01); *H04W 28/0289* (2013.01); *H04W 28/16* (2013.01); *H04W 28/24* (2013.01); *H04W 76/10* (2018.02); *H04W 76/27* (2018.02); *H04W 76/38* (2018.02)

(56) References Cited

U.S. PATENT DOCUMENTS

| | | | |
|---|---|---|---|
| 2010/0095021 A1* | 4/2010 | Samuels | H04L 47/724 709/235 |
| 2012/0151041 A1* | 6/2012 | Gerber | H04L 43/0876 709/224 |
| 2012/0281566 A1* | 11/2012 | Pelletier | H04W 76/27 370/252 |
| 2012/0289232 A1 | 11/2012 | Ostrup et al. | |
| 2013/0007484 A1* | 1/2013 | Gobriel | G06F 1/3209 713/320 |
| 2014/0241317 A1 | 8/2014 | Jamadaghi et al. | |
| 2015/0305056 A1 | 10/2015 | Vangala et al. | |

\* cited by examiner

TRAFFIC CHARACTERISTIC INDICATION FOR CONNECTION ESTABLISHMENT CONTROL

TECHNICAL FIELD

The present invention relates to methods for controlling connectivity to a cellular radio network and to corresponding devices.

BACKGROUND

In current cellular radio networks, e.g., based on the LTE (Long Term Evolution) technology specified by 3GPP ($3^{rd}$ Generation Partnership Project), a radio device, typically referred to as a user equipment (UE), may establish a connection to the cellular radio network via one or more access nodes. Examples of such access nodes are base stations, in the LTE technology referred to as eNB ("evolved Node B"). Such connections may be controlled and managed by nodes of a core network part of the cellular radio network, e.g., an MME (Mobility Management Entity) or S-GW (Serving Gateway) of the LTE technology. The connection may use one carrier or multiple carriers, e.g., through carrier aggregation. In some case, the carriers may be selected from multiple available frequency layers.

When a UE wants to initiate a data transfer to or from the cellular radio network, typically first a signaling connection needs to be established. For example, in the LTE technology an RRC (Radio Resource Control) connection is established by the UE and the eNB. Once the RRC connection is established, the UE can send and receive traffic. The RRC connection may be kept active over multiple individual transfers of data, which means that it is not necessary to establish a new RRC connection for each transfer of data. Typically, the RRC connection is released after a certain period of inactivity, controlled by an inactivity timer. The setting of the inactivity timer is decided by the eNB and is typically is a trade-off between signaling load for setting up the RRC connection and resource availability for maintaining the RRC connection.

Whenever a UE requests a connection the network needs to decide whether and how to establish the connection. The decision whether to establish the connection is also referred to as "admission control". The decision how to establish the connection may involve selecting a cell through which the connection is established, selecting a carrier for establishing the connection, or the like. These processes are typically implemented by connection management functionalities of one or more nodes of the cellular radio network, such as eNBs or MMEs.

However, it is a complex task to ensure that the connection management functionalities take the decisions which are most appropriate from the perspective of user experience and impact on performance of the cellular radio network. In many cases the decisions involve first deciding whether to admit establishment of the connection and, once the connection is established, later evaluating if the connection should be modified, e.g., by moving it to another access node or cell, switching the connection another carrier, releasing the connection, or the like. This may for example have the effect that some connections are not admitted even though their admission would have required only insignificant resources of the cellular radio network, or that connections are admitted which then turn out to require significant resources for handling the associated traffic or managing the connection. Further, the connection management functionalities may in some cases also set the inactivity timer to a value which is too high or to a value which is too low. A too high value of the inactivity timer may have the effect that the connection is maintained excessively long and resources are blocked. A too low value of the inactivity timer may in turn result in additional connection requests by the UE, the handling of which consumes resources both on the UE side and the cellular radio network side.

In 3GPP TS 36.331 V12.6.0 (2015-06), it is specified that the request for establishing the RRC connection, referred to as "RRCConnectionRequest message" may also include a field indicating an establishment cause. This information element may be used for prioritizing emergency calls or certain subscribers, or for distinguishing between different UE configurations. However, this information element provides only limited input to be used for taking appropriate connection management decisions when a regular application triggers establishment of a connection.

Accordingly, there is a need for techniques which allow for efficiently controlling connectivity of a radio device to a cellular radio network.

SUMMARY

According to an embodiment of the invention, a method of controlling connectivity to a cellular radio network is provided. According to the method, multiple applications are configured at a radio device. For each of the multiple applications, the radio device determines at least one characteristic of traffic generated by the application. In response to one of the applications requiring establishment of a connection of the radio device to the cellular radio network, the radio device sends a request for establishing the connection to the cellular radio network, the request indicates the at least one characteristic corresponding to the application.

According to a further embodiment of the invention, a method of controlling connectivity to a cellular radio network is provided. According to the method, an access node of the cellular radio network receives, from a radio device with multiple configured applications, a request for establishing a connection of the radio device to the cellular radio network. The request indicates at least one characteristic of traffic generated by that one of the applications which requires establishment of the connection. Depending on the indicated at least one characteristic, the access node controls establishment of the connection.

According to a further embodiment of the invention, a radio device is provided. The radio device is configured with multiple applications. Further, the radio device is configured to determine, for each of the multiple applications, at least one characteristic of traffic generated by the application. Further, the radio device is configured to, in response to one of the applications requiring establishment of a connection of the radio device to the cellular radio network, send a request for establishing the connection to the cellular radio network. The request indicates the at least one characteristic corresponding to the application.

According to a further embodiment of the invention, an access node is provided. The access node is configured to receive, from a radio device with multiple configured applications, a request for establishing a connection of the radio device to the cellular radio network. The request indicates at least one characteristic of traffic generated by that one of the applications which requires establishment of the connection.

Further, the access node is configured to control establishment of the connection depending on the indicated at least one characteristic.

According to a further embodiment of the invention, a computer program or computer program product is provided, e.g., in the form of a non-transitory storage medium, which comprises program code to be executed by at least one processor of a radio device configured with multiple applications. Execution of the program code causes the radio device to determine, for each of the multiple applications, at least one characteristic of traffic generated by the application. Further, execution of the program code causes the radio device to, in response to one of the applications requiring establishment of a connection of the radio device to the cellular radio network, send a request for establishing the connection to the cellular radio network. The request indicates the at least one characteristic corresponding to the application.

According to a further embodiment of the invention, a computer program or computer program product is provided, e.g., in the form of a non-transitory storage medium, which comprises program code to be executed by at least one processor of an access node of a cellular radio network. Execution of the program code causes the access node to receive, from a radio device with multiple configured applications, a request for establishing a connection of the radio device to the cellular radio network. The request indicates at least one characteristic of traffic generated by that one of the applications which requires establishment of the connection. Further, execution of the program code causes the access node to control establishment of the connection depending on the indicated at least one characteristic.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling connectivity of a radio device, e.g., a UE, to a cellular radio network. In the illustrated examples, the cellular radio network is assumed to be based on the LTE technology. However, it is to be understood that other cellular radio technologies could be utilized as well, e.g., the UMTS (Universal Mobile Telecommunications System) technology. In the following explanations, it is assumed that the In the illustrated concepts, the radio device is assumed to be configured with multiple applications which each may require data transfers to or from the cellular radio network, for which purpose a connection to the cellular radio network may need to be established. As used herein, an application is considered to be a computer program designed to provide one or more functionalities of the radio device. Examples of such applications are messaging applications, multimedia applications, online gaming applications, social media applications, or the like. The applications may be installed by a user and/or be preconfigured, e.g., as part of an operating system of the radio device. The illustrated concepts utilize that characteristics of traffic generated these applications typically vary from application to application. For example, certain multimedia applications may generate large volumes of traffic with a long duration. Other applications, e.g., certain social media applications, may generate single bursts of low volume traffic, e.g., associated with status updates or the like. The illustrated concepts aim at enabling the cellular radio network to distinguish between such different applications and to take into account the individual characteristics of the traffic generated by a certain application. For this purpose, the radio device determines one or more characteristics of the traffic generated by a given application and, when this application requires establishment of a connection to the cellular radio network, indicates the characteristic(s) in a request for establishment of the connection sent to the cellular radio network. The characteristic(s) for each application may be preconfigured and stored in the radio device. Alternatively or in addition, the radio device may learn such characteristic(s) by monitoring the traffic generated by the applications. The characteristic(s) may for example include an indication whether the traffic generated by the application is expected to form a single burst or rather multiple separate bursts, an expected volume of the traffic, e.g., in terms of a classification in for example low volume, medium volume, large volume, and optionally unknown volume, an expected duration of the traffic, e.g., duration of lower than <100 ms, higher than 10 s, or in between, and/or a latency requirement of the traffic, e.g., in terms of a classification as latency sensitive traffic or latency insensitive traffic. As mentioned above, these characteristics are determined individually for each application, so that connection management may be optimized depending on the application which requires establishment of the connection.

Various kinds of connection management processes may be performed depending on the characteristic indicated in the request for establishing the connection. For example, an access node receiving the request may decide depending on the characteristic whether to admit the connection or not. For example, if a cell served by the excess node is close to a configured load limit and the characteristic indicated in the request indicates that a large volume is to be expected for the connection, the access node may decide not to admit the connection. Further, the access node could decide to admit the connection and then move the connection to a less loaded cell. On the other hand, if the characteristic indicates only a single burst of low volume, the access node could decide to admit the connection even though this might result in temporarily exceeding the configured load limit. The latter decision may be more resource efficient than not admitting the connection, because the decision not to admit the connection may trigger resource consuming processes on the network side and also on the side of the radio device, such as signaling the decision not to admit the connection to the radio device or handling subsequent connection requests. Further, if the characteristic indicates an expected duration of the traffic, the access node may set an inactivity timer for controlling releasing of the connection depending on the expected duration of the traffic. In this way, it can for example be achieved that the connection is not released before expiry of the expected duration of the traffic. Further, it can be achieved that the connection is maintained for an excessively long time period after expiry of the expected duration of the traffic. For example, the inactivity timer may be set to a certain default value (which may of course depend on one or more other parameters), and if the characteristic indicated in the request indicates an expected duration below this default value, the inactivity timer may be set to a lower value than the default value, e.g., to a value corresponding to the expected duration of the traffic. Further, if the characteristic indicates that the traffic is latency sensitive, the access node may decide to refrain from performing load balancing by moving the established connection to another cell or to another access node.

Figure 1:
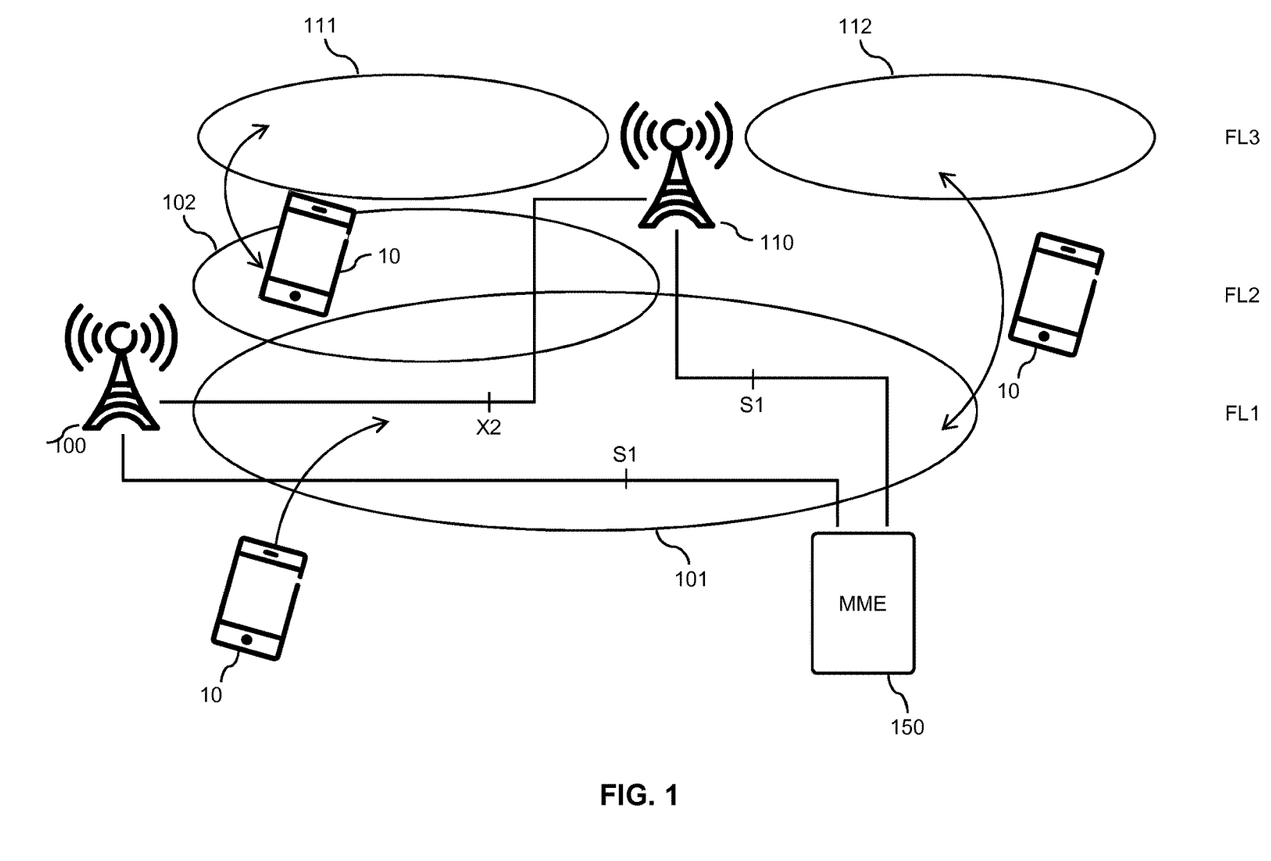
FIG. 1 schematically illustrates a cellular radio network environment in which connectivity is controlled according to an embodiment of the invention.

FIG. 1 schematically illustrates a cellular radio network environment in which the concepts as outlined above may be applied. Specifically, FIG. 1 illustrates infrastructure of the cellular radio network in the form of access nodes 100, 110, in accordance with the assumed utilization of the LTE technology in the following also referred to as eNB 100, 110, and a control node 150, in accordance with the assumed utilization of the LTE technology in the following also referred to as MME 150. In the scenario of FIG. 1, the eNB 100 is assumed to serve a first cell 101 on a first frequency layer FL1 and a second cell 102 on a second frequency layer FL2. The eNB 110 is assumed to serve a third cell 111 and a fourth cell 112 on a third frequency layer FL3. Each frequency layer may allow utilization of one or more corresponding carriers. For example, a connection may be established on the basis of one carrier from one of the frequency layers FL1, FL2, FL3, on the basis of multiple carriers from one of the frequency layers FL1, FL2, FL3, or on the basis of multiple carriers from different frequency layers FL1, FL2, FL3. Such connection using multiple carriers may be based on carrier aggregation, e.g., by using multiple carriers for a connection to one of the eNB 100, 110, and/or on dual connectivity, e.g., by using multiple carriers for a connection to both eNBs 100, 110.

Further, FIG. 1 illustrates radio devices, in the following referred to as UE, which may connect to the cellular radio network by establishing a connection to the eNB 100 and/or to the eNB 110. The establishment and further control of such connections is assumed to be managed by the eNBs 100, 110 and the MME 150. For this purpose, the eNBs 100, 110 may communicate with each other through inter-access node interfaces, e.g., X2 interfaces as specified for the LTE technology. Further, the eNBs 100, 110 may communicate with the MME 150 through corresponding control interfaces, e.g., S1 interfaces as specified for the LTE technology. Signaling on these interfaces may be used to control connection establishment, e.g., with respect to admission control, cell selection, carrier selection, moving of connections, and/or releasing of connections. As mentioned above, these control processes may be optimized in an application specific manner by considering the characteristic(s) indicated in the request for establishing the connection.

Figure 2:
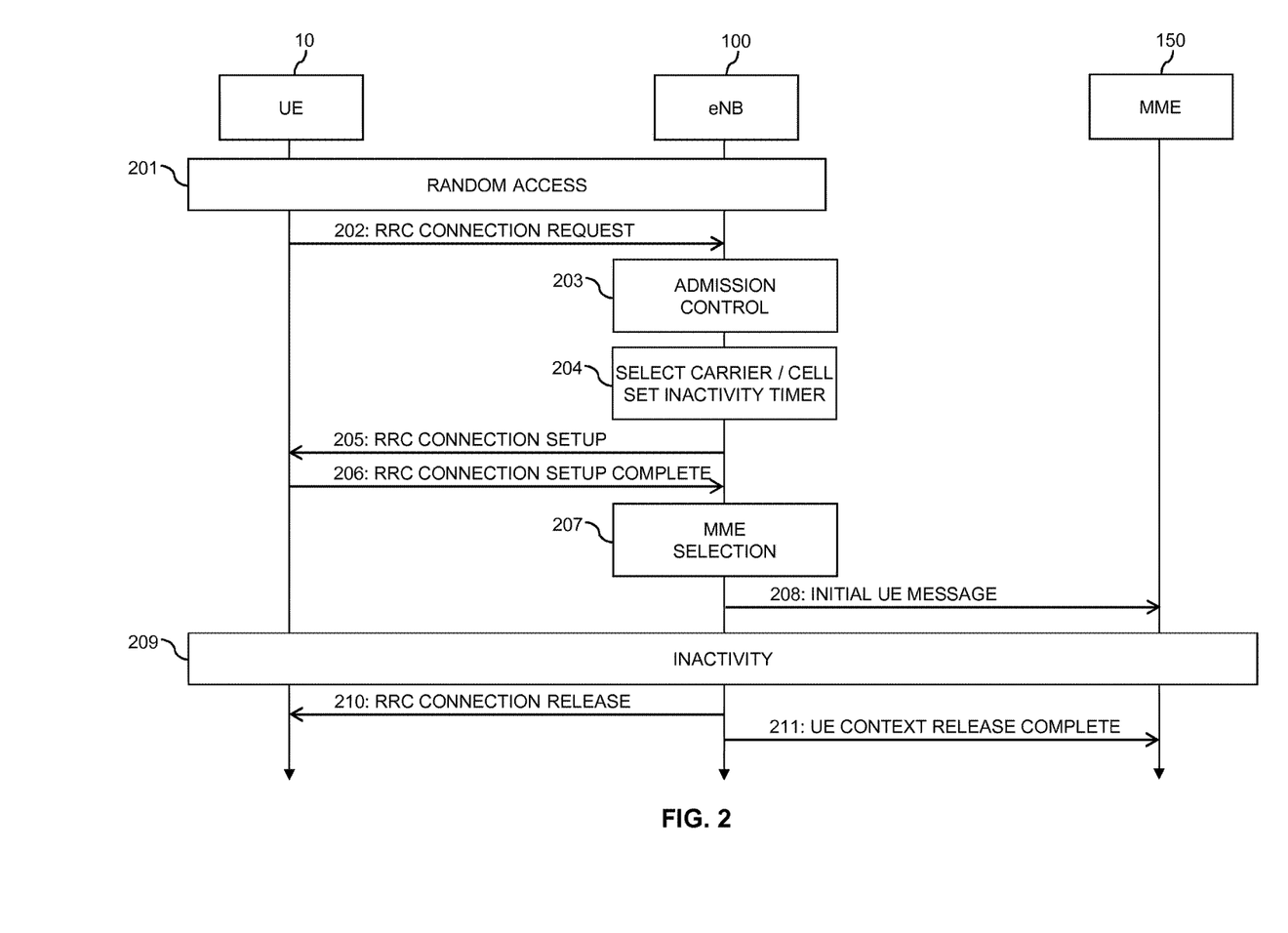
FIG. 2 shows a message flow for illustrating an example of processes according to an embodiment of the invention.

FIG. 2, illustrates exemplary processes for establishing a connection of a UE 10 to the cellular radio network. The UE 10 may correspond to one of the UEs 10 as illustrated in FIG. 1. The processes of FIG. 2 involve the UE 10, the eNB 100, and the MME 150 and are based on procedures for establishing an RRC connection as specified in 3GPP TS 36.331 V12.6.0. The processes of FIG. 2 are assumed to be triggered by one of multiple applications configured at the UE 10 requiring establishment of a connection to the cellular radio network. When detecting this requirement, the UE 10 first determines the characteristic(s) of traffic generated by this application. This may involve obtaining information stored in the UE 10.

An estimate of the characteristic(s) of the traffic generated by a specific application can be obtained initially from parameters included in the application software itself. If no such parameters are included in the application software a default characteristic may be assumed. Such default characteristic may however be updated once the application is used, e.g., by monitoring the traffic generated by the application.

The UE 10 then proceeds by performing a random access procedure 201 with the eNB 100. As a result, the UE 10 synchronize to one of the cells 101, 102 served by the eNB 100. In the example of FIG. 2, it is assumed that the UE 10 synchronizes to the cell 101. However, it is to be understood that processes similar to those described in the following could also be performed when the UE 10 initially synchronizes to the cell 102. The eNB 100 then grants initial uplink radio resources of the cell 101 to the UE 10. The UE 10 utilizes these uplink radio resources for sending an RRC-ConnectionRequest message 202 to the eNB 100. The RRCConnectionRequest message 202 also indicates the previously determined characteristic(s) of the traffic generated by the application. Here, it may be beneficial to indicate the characteristic(s) by small sized parameters, thereby avoiding excessively increasing the data volume of the RRCConnectionRequest message 202.

In response to receiving the RRCConnectionRequest message 202, the eNB 100 performs admission control processes, as illustrated by block 203. This may for example involve deciding whether to admit the connection requested by the RRCConnectionRequest message 202. This admission decision may be based on the characteristic(s) indicated in the RRCConnectionRequest message 202. Further, this admission decision may also be based on various other criteria, such as load of the cell 101 in which establishment of the connection is requested, and/or on other information indicated in the RRCConnectionRequest message 202, e.g., information in the EstablishmentCause field. By way of example, the cell 101 could be close to a maximum load limit and the eNB 100 could thus decide only to admit the requested connection is in the indicated characteristic(s) indicate that the traffic generated by the application is expected to form a single burst of low volume and short duration. In this case, admitting the connection can be even more resource efficient than rejecting the request, because the latter decision may for example result in signaling of the request being rejected toward the UE 10 and the UE 10 retrying the request. In the example of FIG. 2 it is assumed that the eNB 100 admits the connection and then proceeds to perform further control processes related to the establishment of the connection, as illustrated by block 204.

As illustrated, the control processes of block 204 may for example include selecting one or more carriers for the connection, selecting an alternative cell for establishing the connection, setting queuing parameters for the connection, and/or setting an inactivity timer for controlling release of the connection.

By way of example, if the cell 101 in which establishment of the connection is requested is highly loaded and the indicated characteristic(s) of the traffic generated by the application indicate that the traffic is latency insensitive, the eNB 100 may decide to perform load balancing by first establishing the connection in the cell 101 and then moving the connection to another cell, such as the cell 102. The eNB 100 may also decide to move the connection to a cell control by another eNB, such as one of the cells 111, 112 controlled by the eNB 110. If the traffic generated by the application is indicated to be latency insensitive, the eNB 100 may also decide to delay establishment of the connection until resources for establishing the connection become available, e.g., by using a queueing algorithm for handling concurrent requests for establishment of a connection. On the other hand, if the traffic generated by the application is indicated to be latency sensitive, the eNB 100 may set the queueing parameter(s) to establish the connection as soon as possible. One or more parameters of such queueing algorithm may be set depending on the characteristic(s) of the traffic generated by the application. Further, the characteristic(s) may for example indicate that the traffic generated by the application is expected to have a short duration, e.g., shorter than a default value of the inactivity timer applied by the eNB 100, e.g., a default value of a few seconds. The eNB 100 may then set the inactivity timer to a lower value than the default value, e.g., to a value corresponding to the expected duration of the traffic. In this way, it can be avoided that the connection is maintained significantly longer than the expected duration of the traffic, and resources may thus be used in a more efficient manner. In some cases, the eNB 100 may also set the inactivity timer to zero or even completely deactivate usage of the inactivity timer. This may for example be the case if the characteristic(s) indicate that the traffic will consist of only a single data transfer, i.e., a very short single burst. In such cases, the connection may be released immediately after such single data transfer is completed.

The eNB 100 then sends a RRCConnectionSetup message 205 to the UE 10, which initiates setup of the RRC connection between the UE 10 and the eNB 100. Having completed configurations for the setup of the RRC connection, the UE 10 responds with an RRCconnectionSetupComplete message 206 to the eNB 100. The eNB 100 then proceeds with selection of an MME for controlling the connection, as illustrated by block 207. In the illustrated example, it is assumed that the eNB 100 selects the MME 150. Having selected the MME 150, the eNB 100 sends an initial UE message 208, included with the RRCConnectionSetupComplete message 206, to the MME 150. At this stage, establishment of the connection is completed, and the UE 10 may send or receive traffic generated by the application via the connection.

As further illustrated in FIG. 2, at some point a period of inactivity 209 may follow. For example, this period of connectivity may be due to the UE 10 having completed all pending data transfers required by the application. In response to detecting the inactivity, the eNB 100 start the inactivity timer. If the application becomes active again before the inactivity timer has expired, then the inactivity timer is stopped and reset. After expiry of the inactivity timer without any further data transfer on the connection, the eNB 100 initiates releasing of the connection. As illustrated, this involves sending a RRCConnectionRelease message 210 to the UE 10 and sending a UEContextReleaseComplete message 211 to the MME 150. By setting the value of the inactivity timer at block 204, the timing when the releasing of the connection is initiated may be controlled depending on the characteristic(s) indicated in the RRCRonnectionRequest message 202. In this way, some connections may be released earlier, e.g., connections for which it was indicated that the traffic is expected to form a single burst, while other connections may be released later, e.g., connection for which it was indicated that the traffic is expected to form multiple bursts over a longer duration.

As mentioned above, the UE 10 and/or the eNB 100 may also monitor the traffic on the connection and use statistic information obtained by this monitoring for dynamically updating the characteristic(s) stored by the UE 10. In this way, for example expected data volumes, expected durations of traffic, and/or the burst characteristic of the traffic may be determined in a refined manner and individually for each UE 10. For example, when the connection is released, the UE 10 may statistically evaluate the information obtained by monitoring the traffic, e.g., a measured data volume or duration of the traffic, compare the statistically evaluated characteristic(s) to the stored characteristic(s) and adapt the stored characteristic(s) based on this comparison. In this way, the stored characteristic(s) may be refined by statistical data. In some scenarios, also the eNB 100 may contribute to search updating of the characteristic(s). For example, also the eNB 100 could monitor the traffic, and the stored characteristics could be updated based on the monitoring results obtained by the eNB 100. In some cases where no initial information on the characteristic(s) is available, e.g., from the application software, the characteristic(s) may also be determined exclusively based on such monitoring processes.

Figure 3:
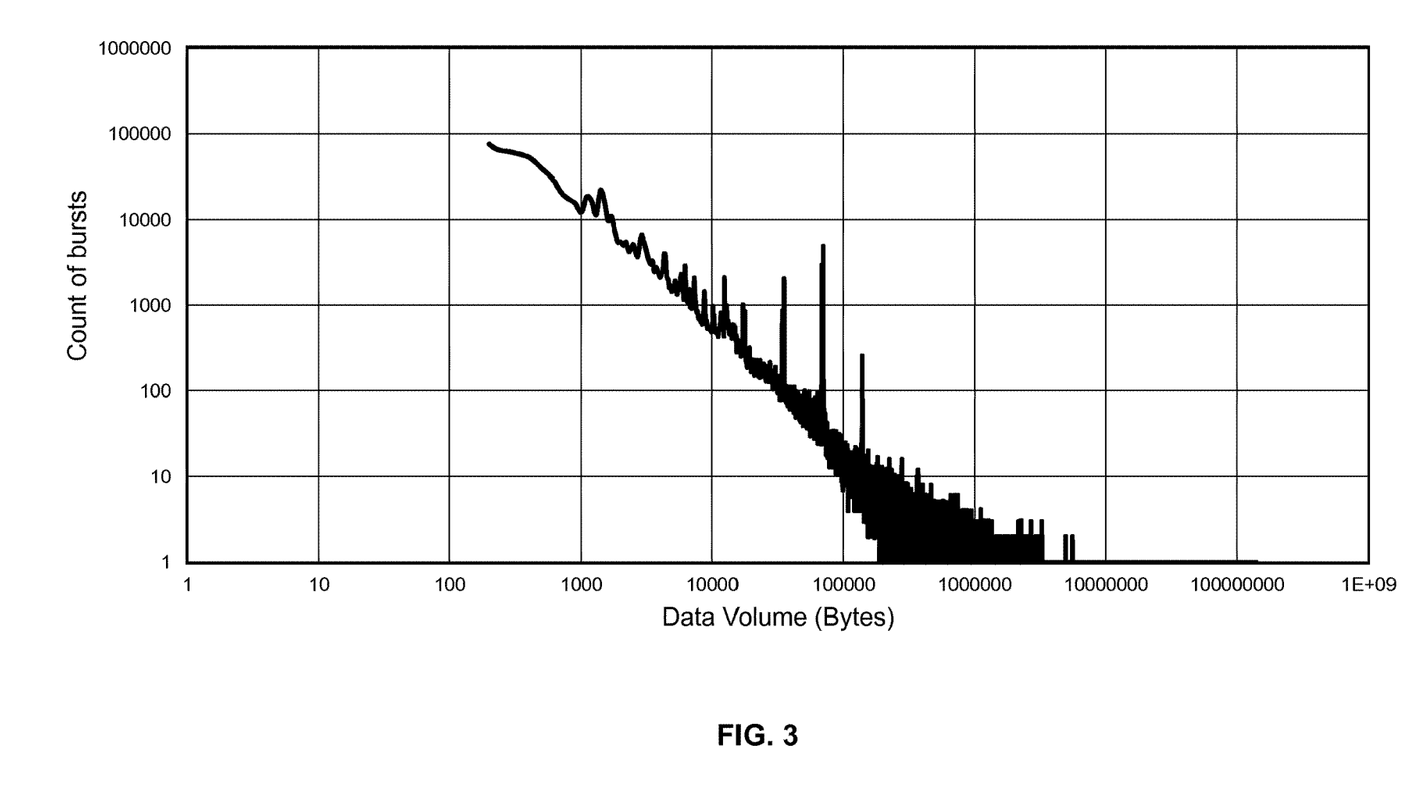
FIG. 3 shows a distribution of data volume of connections as an example of a traffic characteristic which may be utilized in an embodiment of the invention.

The utilization of the characteristic(s) of application traffic when controlling establishment of the connection is particularly valuable in situations where a cell is highly loaded, which may require rejecting requests for establishing a connection. In such situations, connections for which the characteristics indicate a low impact on the load may nonetheless be admitted. This may allow for on the one hand improving user experience and on the other hand improving resource efficiency, e.g., because signaling, evaluations, or measurements which may follow from rejection of admission of a connection can be avoided. That such situations are actually relevant in practice can be seen from FIG. 3, which shows a distribution of data volume transferred over a connection versus number of connections for a typical North American cellular radio network, sampled over one hour. As can be seen, there is a significant number of connections with very small data volume, and by utilizing the indication of characteristics of application traffic as described above, such small volume connections could be admitted in high load situations without severely impacting performance of the cellular radio network.

Figure 4:
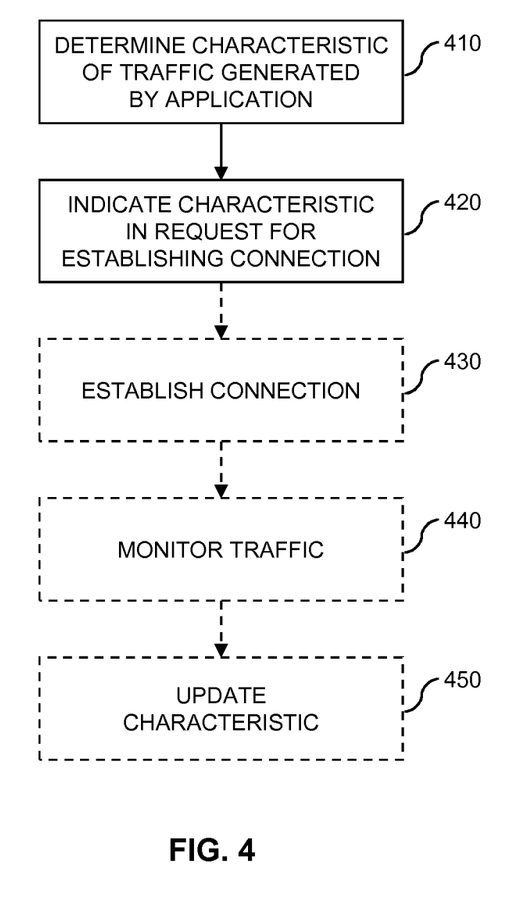
FIG. 4 shows a flowchart for schematically illustrating a method according to an embodiment of the invention, which may be implemented by a radio device.

FIG. 4 shows a flowchart for illustrating a method of controlling connectivity to a cellular radio network. The method may be utilized for implementing the illustrated concepts in a radio device, e.g., the above-mentioned UE 10. If a processor-based implementation of the radio device is used, the steps of the method may be performed by one or more processors of the radio device. In such a case the radio device may further comprise a memory in which program code or other information for implementing the below described functionalities is stored.

At step 410, the radio device determines at least one characteristic of traffic generated by an application. This is accomplished for each of multiple applications configured at the radio device.

The at least one characteristic may indicate whether the traffic is expected to form a single burst or if the traffic is rather expected to form a sequence of multiple data transfers which may be separated in time. In addition or as an alternative, the at least one characteristic may indicate an expected volume of the traffic, an expected volume of the traffic, an expected duration of the traffic, and/or a latency requirement of the traffic. For example, this may be accomplished in terms of a classification, e.g., a classification as low volume traffic or high volume traffic, a classification of low duration traffic or high duration traffic, or a classification as latency sensitive traffic or latency insensitive traffic.

At step 420, the radio device sends a request for establishing a connection to the cellular radio network. This is accomplished in response to one of the applications requiring establishment of the connection. The request indicates the at least one characteristic corresponding to the application. The request may be an RRC Connection Request, e.g., an RRCConnectionRequest message as specified in 3GPP TS 36.331 V12.6.0, and the characteristic(s) may be indicated in an additional field of such message.

At optional step 430, the radio device may establish a connection for one of the applications to the cellular radio network. This may for example be the connection for which establishment was requested by the request sent at step 420. For example, the connection may be established in response to the cellular radio network admitting the connection. The decision whether to admit the connection may be based on the at least one characteristic indicated in the request sent at step 420.

At optional step 440, the radio device may monitor the traffic generated by the application. In particular, the radio device may monitor tour the traffic on the connection established at step 430. The radio device may statistically evaluate information obtained by this monitoring, e.g., a measured volume of the traffic, a measured duration of the traffic, or a burst characteristic of the traffic. The determination of the at least one characteristic at step 410 may be based on the information obtained by this monitoring of the traffic.

At optional step 450, the radio device may update the at least one characteristic based on the information obtained at step 440.

Figure 5:
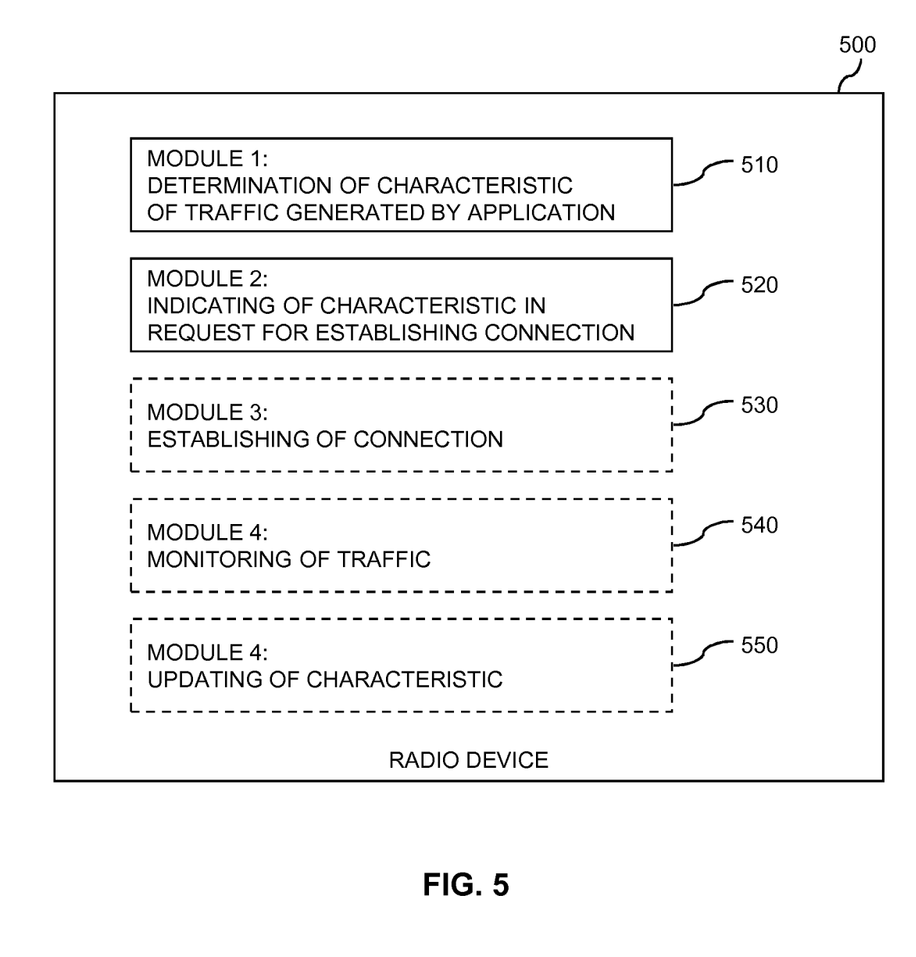
FIG. 5 shows a block diagram for illustrating functionalities of a radio device according to an embodiment of the invention.

FIG. 5 shows a block diagram for illustrating functionalities of a radio device 500 which operates according to the method of FIG. 4. As illustrated, the radio device 500 may be provided with a module 510 configured to determine at least one characteristic of traffic generated by each of multiple applications configured at the radio device, such as explained in connection with step 410. Further, the radio device 500 may be provided with a module 520 configured to indicate the at least one characteristic in a request for establishing a connection, such as explained in connection with step 520. Further, the radio device 500 may optionally be provided with a module 530 configured to establish a connection, such as explained in connection with step 430. Further, the radio device 500 may optionally be provided with a module 540 configured to monitor traffic generated by an application, such as explained in connection with step 440. Further, the radio device 500 may optionally be provided with a module 550 configured to update the at least one characteristic, such as explained in connection with step 450.

It should be understood that the radio device 500 may also include further modules for implementing other functionalities, such as functionalities for hosting the applications or for performing and managing data transfers associated with the applications, and that the modules of the radio device 500 do not necessarily represent a hardware structure of the radio device 500, but may also correspond to functional elements, e.g., implemented by hardware, software, or a combination thereof.

Figure 6:
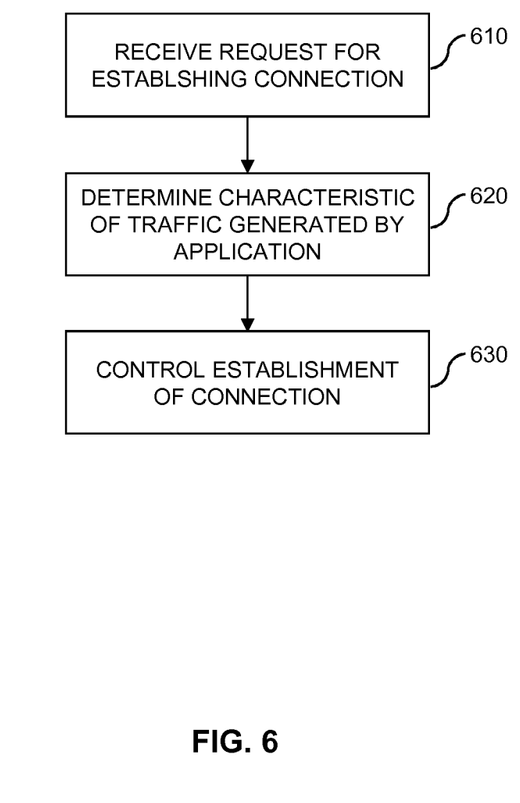
FIG. 6 shows a flowchart for schematically illustrating a further method according to an embodiment of the invention, which may be implemented by an access node.

FIG. 6 shows a flowchart for illustrating a method of controlling connectivity to a cellular radio network. The method may be utilized for implementing the illustrated concepts in an access node of the cellular radio network, e.g., the eNB 100. If a processor-based implementation of the access node is used, the steps of the method may be performed by one or more processors of the access node. In such a case the access node may further comprise a memory in which program code or other information for implementing the below described functionalities is stored.

At step 610, the access node of the cellular radio network receives, from a radio device with multiple configured applications, a request for establishing a connection of the radio device to the cellular radio network. The request indicates at least one characteristic of traffic generated by that one of the applications which requires establishment of the connection.

The at least one characteristic may indicate whether the traffic is expected to form a single burst or if the traffic is rather expected to form a sequence of multiple data transfers which may be separated in time. In addition or as an alternative, the at least one characteristic may indicate an expected volume of the traffic, an expected volume of the traffic, an expected duration of the traffic, and/or a latency requirement of the traffic. For example, this may be accomplished in terms of a classification, e.g., a classification as low volume traffic or high volume traffic, a classification of low duration traffic or high duration traffic, or a classification as latency sensitive traffic or latency insensitive traffic.

At step 620, the access node determines the at least one characteristic from the request received at step 610. This may for example be accomplished by extracting the at least one characteristic from a corresponding information field of the request.

At step 630, the access node controls establishment of the connection depending on the at least one characteristic as indicated in the request received at step 610 and determined at step 620. The controlling of establishment of the connection may involve deciding whether to admit establishment of the connection. Further, the controlling of establishment of the connection may involve deciding whether delaying establishment of the connection is tolerable. Further, the controlling of establishment of the connection may involve selecting one or more carriers for the connection. If multiple carriers are selected, these may for example be used in a carrier aggregation configuration and/or a dual connectivity configuration. Further, the controlling of establishment of the connection may involve deciding whether to transfer the connection to another access node or other cell, e.g., for purposes of load-balancing. Further, the controlling of establishment of the connection may involve configuring a timer for controlling inactivity-triggered release of the connection.

Figure 7:
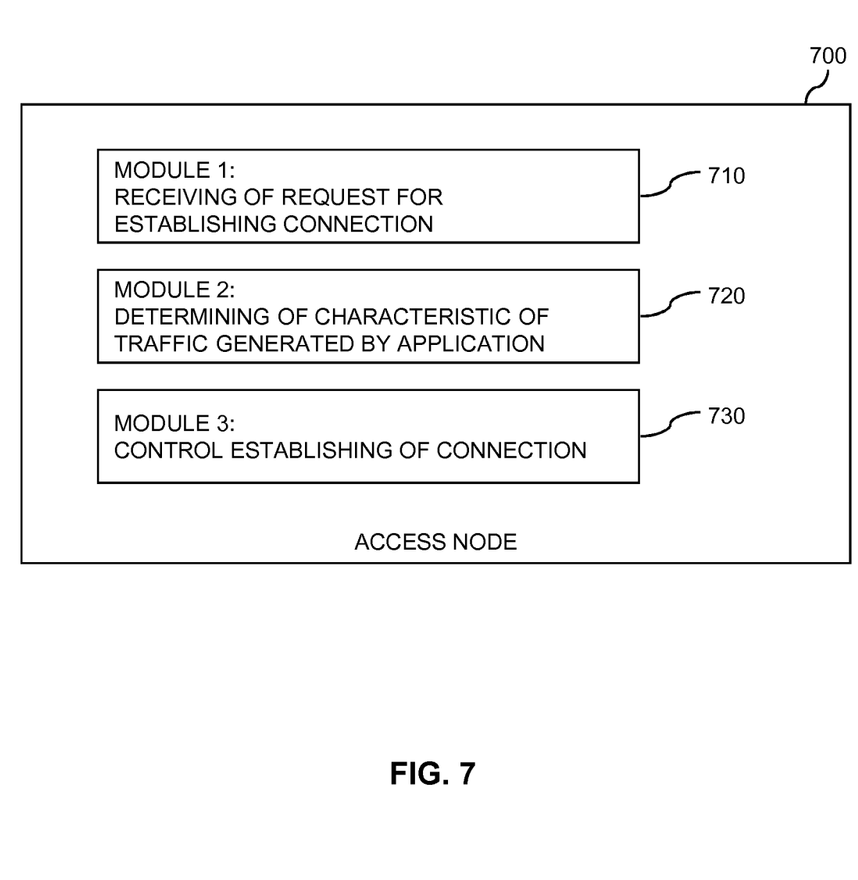
FIG. 7 shows a block diagram for illustrating functionalities of an access node according to an embodiment of the invention.

FIG. 7 shows a block diagram for illustrating functionalities of an access node 700 which operates according to the method of FIG. 6. As illustrated, the access node 700 may be provided with a module 710 configured to receive a request for establishing a connection, the request indicating at least one characteristic of traffic generated by an applications which requires establishment of the connection, such as explained in connection with step 610. Further, the access node 700 may be provided with a module 720 configured to determine the at least one characteristic from the request, such as explained in connection with step 620. Further, the access node 700 may optionally be provided with a module 730 configured to control establishment of the connection depending on the indicated at least one characteristic, such as explained in connection with step 730.

It should be understood that the access node 700 may also include further modules for implementing other functionalities, such as functionalities for performing or managing data transfers associated with the applications, and that the modules of the access node 700 do not necessarily represent a hardware structure of the access node 700, but may also correspond to functional elements, e.g., implemented by hardware, software, or a combination thereof.

Figure 8:
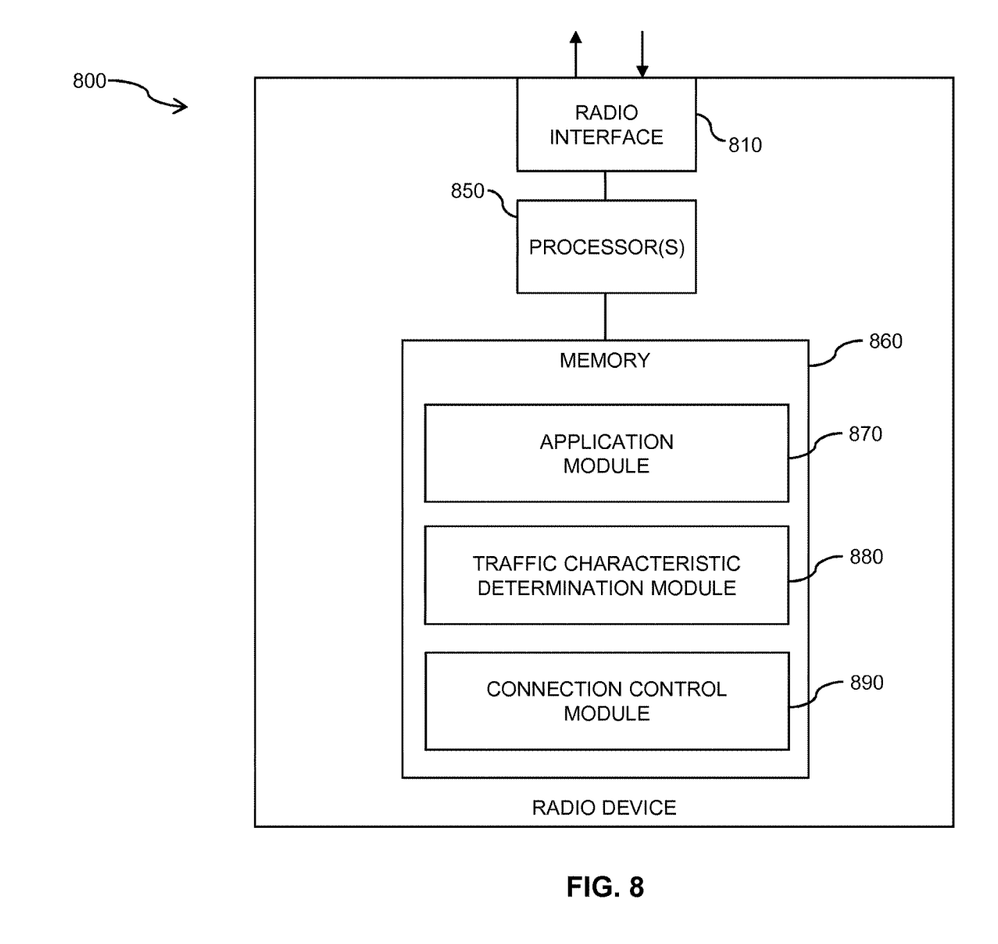
FIG. 8 schematically illustrates exemplary structures of a radio device according to an embodiment of the invention.

FIG. 8 illustrates exemplary structures which may be used for implementing the above concepts in a radio device 800, such as the UE 10. The radio device 800 may for example correspond to a mobile phone or to some other type of UE.

As illustrated, the radio device 800 may include a radio interface 810 for enabling access of the radio device 800 to a cellular radio network, e.g., a cellular radio network based on the LTE technology. The radio interface 810 may for example implement the Uu radio interface of the LTE radio technology.

Further, the radio device 800 may include one or more processors 850 coupled to the radio interface 810, and a memory 860 coupled to the processor(s) 850. The memory 860 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 860 includes suitably configured program code to be executed by the processor(s) 850 so as to implement the above-described functionalities of a radio device. In particular, the memory 860 may include various program code modules for causing the radio device 800 to perform processes as described above, e.g., corresponding to the method steps of FIG. 4.

As illustrated, the memory 860 may include an application module 870 for enabling configuration of a plurality of applications, such as explained in connection with step 410 of FIG. 4. Further, the memory 860 may include a traffic characteristic determination module 880 for implementing the above-described functionalities of determining characteristics of traffic generated by the applications, such as explained in connection with step 420 of FIG. 4. Further, the memory 860 may also include a connection control module 890 for implementing the above-described functionalities related to establishment of a connection, specifically generating and sending the request for establishing the connection, such as described in connection with step 420 of FIG. 4.

It is to be understood that the structures as illustrated in FIG. 8 are merely schematic and that the radio device 800 may actually include further components which, for the sake of clarity, have not been illustrated, e.g., further interfaces or processors. Also, it is to be understood that the memory 860 may include further types of program code modules, which have not been illustrated, e.g., program code modules for implementing known functionalities of a UE or similar radio device. According to some embodiments, also a computer program may be provided for implementing functionalities of the radio device 800, e.g., in the form of a physical medium storing the program code and/or other data to be stored in the memory 860 or by making the program code available for download or by streaming.

Figure 9:
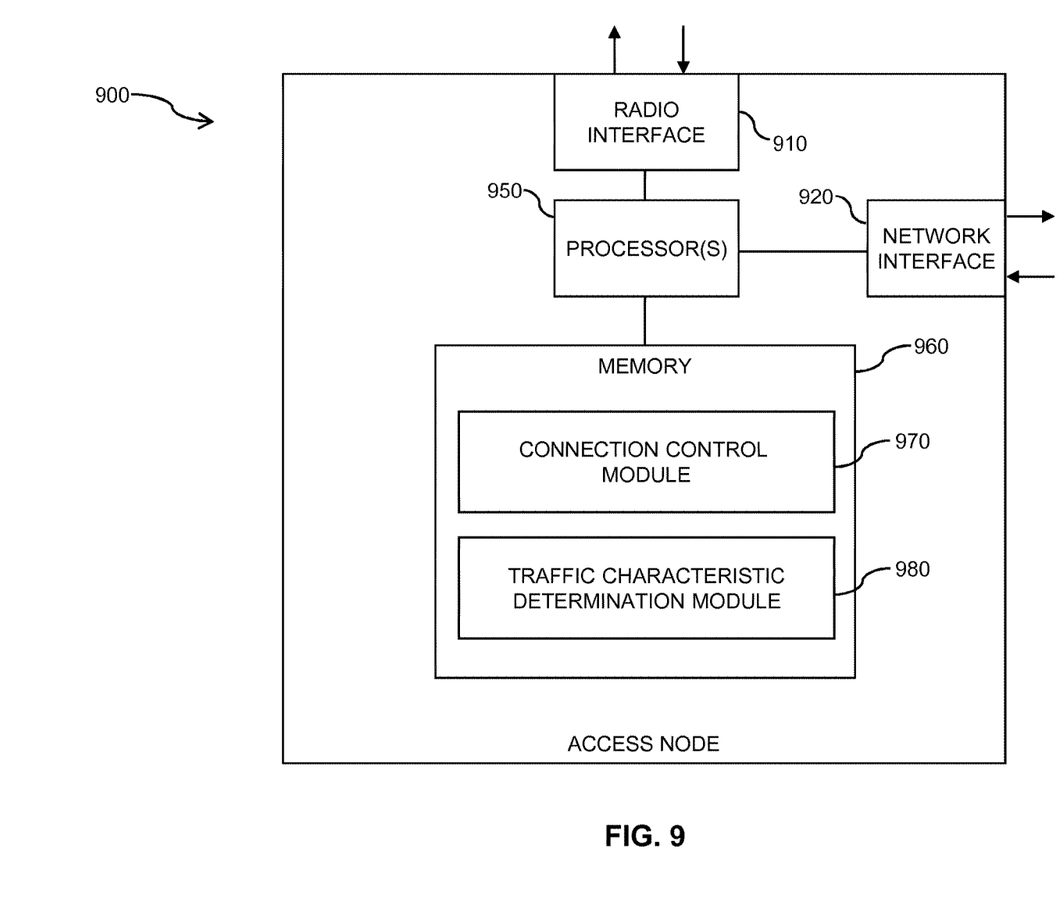
FIG. 9 schematically illustrates exemplary structures of an access node according to an embodiment of the invention.

FIG. 9 illustrates exemplary structures which may be used for implementing the above concepts in an access node 900 of a cellular radio network, e.g., a cellular radio network based on the LTE technology. The access node 900 may for example correspond to an eNB, such as the eNB 100, or to some other type of base station.

As illustrated, the access node 900 may include a radio interface 910 for enabling access of one or more radio devices, such as the above-mentioned UEs 10, the radio device 500, or the radio device 800, to the cellular radio network. The radio interface 910 may for example implement the Uu radio interface of the LTE radio technology. As further illustrated, the access node 900 may include a network interface 920 for connecting the access node to other nodes of the cellular radio network, e.g., to other access nodes or to nodes of a core network part of the cellular radio network. The network interface 920 may for example implement the X2 and/or S1 interface of the LTE technology.

Further, the access node 900 may include one or more processors 950 coupled to the radio interface 910 and network interface 920, and a memory 960 coupled to the processor(s) 950. The memory 960 may include a ROM, e.g., a flash ROM, a RAM, e.g., a DRAM or SRAM, a mass storage, e.g., a hard disk or solid state disk, or the like. The memory 960 includes suitably configured program code to be executed by the processor(s) 950 so as to implement the above-described functionalities of an access node. In particular, the memory 960 may include various program code modules for causing the access node 900 to perform processes as described above, e.g., corresponding to the method steps of FIG. 6.

As illustrated, the memory 960 may include an connection control module 970 for implementing the above-described functionalities related to establishment of a connection, specifically receiving and processing the request for establishing the connection, such as described in connection with step 610 of FIG. 6, and performing processes for controlling establishment of the connection, such as described in connection with step 630 of FIG. 6. Further, the memory 960 may include a traffic characteristic determination module 980 for implementing the above-described functionalities of determining the characteristics of traffic generated by applications from the request for establishing the connection, such as explained in connection with step 620 of FIG. 6.

It is to be understood that the structures as illustrated in FIG. 9 are merely schematic and that the access node 900 may actually include further components which, for the sake of clarity, have not been illustrated, e.g., further interfaces or processors. Also, it is to be understood that the memory 960 may include further types of program code modules, which have not been illustrated, e.g., program code modules for implementing known functionalities of an eNB or similar access node. According to some embodiments, also a computer program may be provided for implementing functionalities of the access node 900, e.g., in the form of a physical medium storing the program code and/or other data to be stored in the memory 960 or by making the program code available for download or by streaming.

As can be seen, the concepts as described above may be used for efficiently controlling connectivity of radio devices to a cellular radio network. The concepts allow for achieving a more stable behavior of connections in the cellular radio network, because a connection can be setup right from the start in such a way that it best suits the characteristics of the expected traffic so that subsequent adjustments can be avoided. This in turn may allow for a higher efficiency in terms of signaling load, computational resources or required measurements. Further, the concepts allow for reducing a risk that a connection for latency sensitive traffic is rejected by admission control or is moved to another cell or access node for load balancing, thereby generating undesired delays. Further, the concepts allow for avoiding too early and too late releasing of a connection by setting the inactivity timer depending on the characteristic(s) of the expected traffic, which in turn allows for achieving a higher resource efficiency. These benefits are particularly significant in scenarios involving a high number of applications generating traffic of typically low volume and with low latency sensitivity.

It is to be understood that the examples and embodiments as explained above are merely illustrative and susceptible to various modifications. For example, the illustrated concepts may be applied in connection with various cellular radio network technologies. Further, other characteristics of traffic generated by an application could be considered in addition or as an alternative. Moreover, it is to be understood that the above concepts may be implemented by using correspondingly designed software to be executed by one or more processors of an existing device, or by using dedicated device hardware. Further, it should be noted that the illustrated radio device may be implemented as a single device or as a system of multiple interacting devices.

The invention claimed is:

1. A method of controlling connectivity to a cellular radio network, the method comprising:
   for each of multiple applications configured at a radio device, the radio device determining at least one characteristic of traffic generated by the application; and
   in response to one of the applications requiring establishment of a connection of the radio device to the cellular radio network, the radio device sending a request for establishing the connection to the cellular radio network, the request indicating the at least one characteristic corresponding to the application;
   wherein the at least one characteristic indicates whether the traffic is expected to form a single burst, and not a sequence of multiple data transfers separated in time.

2. The method according to claim 1, wherein the request is a Radio Resource Control Connection Request.

3. The method according to claim 1, wherein the at least one characteristic indicates an expected volume of the traffic.

4. The method according to claim 1, wherein the at least one characteristic indicates an expected duration of the traffic.

5. The method according to claim 1, wherein the at least one characteristic indicates a latency requirement of the traffic.

6. The method according to claim 1, further comprising:
   for one of the applications, the radio device establishing a connection to the cellular radio network;
   the radio device monitoring the traffic generated by the application based on the established connection; and
   the radio device determining the at least one characteristic for this application based on the monitoring of the traffic.

7. A method of controlling connectivity to a cellular radio network, the method comprising:
   an access node of the cellular radio network receiving, from a radio device with multiple configured applications, a request for establishing a connection of the radio device to the cellular radio network, the request indicating at least one characteristic of traffic generated by that one of the applications which requires establishment of the connection; and
   depending on the indicated at least one characteristic, the access node controlling establishment of the connection;
   wherein the at least one characteristic indicates whether the traffic is expected to form a single burst, and not a sequence of multiple data transfers separated in time.

8. The method according to claim 7, wherein said controlling establishment of the connection comprises deciding whether to admit establishment of the connection.

9. The method according to claim 7, wherein said controlling establishment of the connection comprises deciding whether delaying establishment of the connection is tolerable.

10. The method according to claim 7, wherein said controlling establishment of the connection comprises selecting one or more carriers for the connection.

11. The method according to claim 7, wherein said controlling establishment of the connection comprises deciding whether to transfer the connection to another access node.

12. The method according to claim 7, wherein said controlling establishment of the connection comprises configuring a timer for controlling inactivity-triggered release of the connection.

13. The method according to claim 7, wherein the request is a Radio Resource Control Connection Request.

14. The method according to claim 7, wherein the at least one characteristic indicates an expected volume of the traffic.

15. The method according to claim 7, wherein the at least one characteristic indicates an expected duration of the traffic.

16. The method according to claim 7, wherein the at least one characteristic indicates a latency requirement of the traffic.

17. A radio device, the radio device being configured to:
   for each of multiple applications configured at the radio device, determine at least one characteristic of traffic generated by the application; and
   in response to one of the applications requiring establishment of a connection of the radio device to the cellular radio network, send a request for establishing the connection to the cellular radio network, the request indicating the at least one characteristic corresponding to the application;
   wherein the at least one characteristic indicates whether the traffic is expected to form a single burst, and not a sequence of multiple data transfers separated in time.

18. An access node for a cellular network, the access node being configured to:
   receive, from a radio device with multiple configured applications, a request for establishing a connection of the radio device to the cellular radio network, the request indicating at least one characteristic of traffic generated by that one of the applications which requires establishment of the connection; and
   depending on the indicated at least one characteristic, control establishment of the connection;
   wherein the at least one characteristic indicates whether the traffic is expected to form a single burst, and not a sequence of multiple data transfers separated in time.

* * * * *